US008411681B2

(12) United States Patent
Chun et al.

(10) Patent No.: US 8,411,681 B2
(45) Date of Patent: Apr. 2, 2013

(54) MULTICASTING METHOD IN NETWORK INCLUDING T-MPLS NETWORK AND WDM NETWORK AND APPARATUS THEREFOR

(75) Inventors: Kyung-Gyu Chun, Daejeon (KR); Soon Seok Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 631 days.

(21) Appl. No.: 12/607,208

(22) Filed: Oct. 28, 2009

(65) Prior Publication Data

US 2010/0142380 A1    Jun. 10, 2010

(30) Foreign Application Priority Data

Dec. 10, 2008  (KR) .......................... 10-2008-0125252
Apr. 27, 2009  (KR) .......................... 10-2009-0036599

(51) Int. Cl.
*H04L 12/28* (2006.01)
(52) U.S. Cl. ..................................... 370/390; 370/395.5
(58) Field of Classification Search .................. None
See application file for complete search history.

(56) References Cited

U.S. PATENT DOCUMENTS

| 7,372,853 | B2  |   | 5/2008  | Sharma et al. |           |
|-----------|-----|---|---------|---------------|-----------|
| 7,616,632 | B2  | * | 11/2009 | Loa et al.    | 370/389   |
| 7,778,236 | B2  | * | 8/2010  | Yu            | 370/351   |
| 7,787,457 | B2  | * | 8/2010  | Huang et al.  | 370/390   |
| 8,050,279 | B2  | * | 11/2011 | Li et al.     | 370/395.5 |
| 2002/0131418 | A1 | * | 9/2002 | Raftelis et al. | 370/395.3 |
| 2004/0008685 | A1 | * | 1/2004 | Yamano et al.  | 370/395.5 |
| 2005/0010685 | A1 | * | 1/2005 | Ramnath et al. | 709/238 |
| 2005/0047392 | A1 | * | 3/2005 | Ashwood Smith  | 370/351 |
| 2005/0083858 | A1 | * | 4/2005 | Loa et al.     | 370/254 |
| 2005/0265329 | A1 | * | 12/2005 | Havala et al. | 370/389 |
| 2006/0153563 | A1 |   | 7/2006 | Feuer et al.    |         |
| 2006/0182105 | A1 |   | 8/2006 | Kim et al.      |         |
| 2007/0036080 | A1 | * | 2/2007 | Addeo et al.   | 370/241.1 |

FOREIGN PATENT DOCUMENTS

KR   10-2006-0081963   7/2006

\* cited by examiner

*Primary Examiner* — Hassan Kizou
*Assistant Examiner* — Roberta A Shand
(74) *Attorney, Agent, or Firm* — Staas & Halsey LLP

(57) ABSTRACT

A multicasting method and apparatus in a network including a transport multiprotocol label switch (T-MPLS) network and a wavelength division multiplexing (WDM) network are disclosed. At least one of first switches, connected to the T-MPLS network, second switches connected to the WDM network, and a switch hub establishes a multicasting path by using a label switch path (LSP) ID and a label switch router (LSR) ID, in which the first switch on the multicasting path multicasts a T-MPLS signal, the switch hub converts the T-MPLS signal into an optical multicasting signal and multicasts the converted optical multicasting signal, and the second switch receives the optical multicasting signal and multicasts it in units of the T-MPLS signal.

17 Claims, 7 Drawing Sheets

US 8,411,681 B2

MULTICASTING METHOD IN NETWORK INCLUDING T-MPLS NETWORK AND WDM NETWORK AND APPARATUS THEREFOR

CROSS-REFERENCE TO RELATED APPLICATIONS

This application claims the priorities of Korean Patent Application No. 10-2008-0125252 filed on Dec. 10, 2008 and Korean Patent Application No. 10-2009-0036599 filed on Apr. 27, 2009, in the Korean Intellectual Property Office, the disclosure of which is incorporated herein by reference.

BACKGROUND OF THE INVENTION

1. Field of the Invention

The present invention relates to a multicast technique for an IP-TV and, more particularly, to a multicasting technique for an IP-TV employing a transport multiprotocol label switching (T-MPLS) multicasting technique and an optical multicasting technique.

2. Description of the Related Art

In general, in order to provide a broadcast service for an IP-TV, IP traffic is duplicated and transferred to desired subscribers to allow them to share the same data. This has been supported by using a multicasting technique utilizing an IP router in a network.

IP multicasting requires a multicasting protocol such as a protocol independent multicast-sparse mode (PIM-SM), and therefore, an IP router is essential to operate it.

However, when packets pass through several IP routers, the packets may collide, possibly degrading signal quality at a final reception end.

In addition, in order to transfer a large capacity of TV channels to a certain area all at once, a high performance router is required, network controlling is complicated, and a network operation is ineffective.

Thus, a multicasting method capable of multicasting a large capacity of IP-TV data without an IP router, preventing degradation of a signal quality, increasing network efficiency, and simply controlling a network is required.

A transport multiprotocol label switching (T-MPLS) technique, which has been developed by ITU-T, complements the drawbacks of a packet transmission by applying an operation, administration & maintenance (OAM) for high reliability, the merits of an existing synchronous optical NET work/synchronous digital hierarchy (SONET/SDH) technique, and a protection switching technique to an MPLS technique.

However, a multicasting technique using T-MPLS and a multicasting technique in a hybrid form, interworking with an optical switch, are yet to be developed.

For reference, currently, G.8112 defines an interface with respect to the T-MPLS network, Y.1720 recommends a protection switching method with respect to the T-MPLS network, and Y.1711 recommends a T-MPLS OAM.

SUMMARY OF THE INVENTION

An aspect of the present invention provides a multicasting method in a network capable of multicasting a large capacity of IP-TV data by using a transport multiprotocol label switching (T-MPLS) multicasting technique and an optical multicasting technique without degrading a signal quality, increasing network efficiency, and simplifying network controlling, and an apparatus therefor.

According to an aspect of the present invention, there is provided a multicasting method in a network including a transport multiprotocol label switching (T-MPLS) network in which first switches are connected, and a wavelength division multiplexing (WDM) network in which second switches and a switch hub are connected, the method including: establishing, by using at least one of the first switches, the second switches, and the switch hub, a multicasting path by registering its label switch path (LSP) ID and a label switch router (LSR) ID to an upper node; and replacing, by the first switch, the second switch, or the switch hub on the multicasting path, an LSP ID included in a multicasting signal transferred from the upper node into an LSP ID of a lower node, and multicasting the multicasting signal to the lower node, wherein the first switch multicasts a T-MPLS signal, the switch hub converts the T-MPLS signal into an optical multicasting signal and multicasts the converted optical multicasting signal, and the second switch converts the optical multicasting signal in units of the T-MPLS signals and multicast the same.

According to another aspect of the present invention, there is provided a method of operating a multicasting switch connected to a transport multiprotocol label switching (T-MPLS) network in a network including the T-MPLS network and a wavelength division multiplexing (WDM) network, the method including: requesting the establishment or release of a multicasting path by transmitting a multicasting request signal or a multicast release signal including a label switch path (LSP) ID and a label switch router (LSR) ID to an upper node; establishing a multicasting path to a lower node by storing the LSP ID and the LSR ID included in the multicasting request signal transmitted from the lower node, or releasing a multicasting path to the lower node by erasing the LSP ID and the LSR ID included in the multicast release signal transmitted from the lower node; and including the LSP ID of the lower node to a T-MPLS signal and multicasting the T-MPLS signal.

According to another aspect of the present invention, there is provided a network switch connected to a wavelength division multiplexing (WDM) network of a network including a transport multiprotocol label switching (T-MPLS) network and the WDM network, the network switch including: an optical drop and continue (D&C) switch configured to drop an optical multicasting signal transmitted via the WDM network; and a multicasting switch configured to convert the optical multicasting signal, which has been dropped by the optical D&C switch, into a T-MPLS signal and multicast the converted T-MPLS signal, wherein the multicasting switch requests the establishment or release of a multicasting path by transmitting a multicasting request signal or a multicast release signal including a label switch path (LSP) ID and a label switch router (LSR) ID to an upper node, and establishes a multicasting path to a lower node by storing the LSP ID and the LSR ID included in the multicasting request signal transmitted from the lower node or releases a multicasting path to the lower node by erasing the LSP ID and the LSR ID included in the multicast release signal transmitted from the lower node.

According to another aspect of the present invention, there is provided a switch hub connected to a wavelength division multiplexing (WDM) network of a network including a transport multiprotocol label switching (T-MPLS) network and the WDM network, the switch hub including: an optical hub switch configured to multicast an optical multicasting signal to the WDM network; and a multicasting switch configured to convert a T-MPLS signal transmitted from the T-MPLS network into the optical multicasting signal and transfer the converted optical multicasting signal to the optical hub switch, wherein the multicasting switch requests the establishment of a multicasting path by transmitting a multicasting request signal including a label switch path (LSP) ID and a label switch router (LSR) ID to an upper node, or requests the release of a multicasting path by transmitting a multicasting release signal including the LSP ID and the LSR ID to the upper node, establishes a multicasting path to a lower node by storing the LSP ID and the LSR ID included in the multicasting request signal transmitted from the lower node, or releases a multicasting path to the lower node by erasing the LSP ID and the LSR ID included in the multicast release signal transmitted from the lower node.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
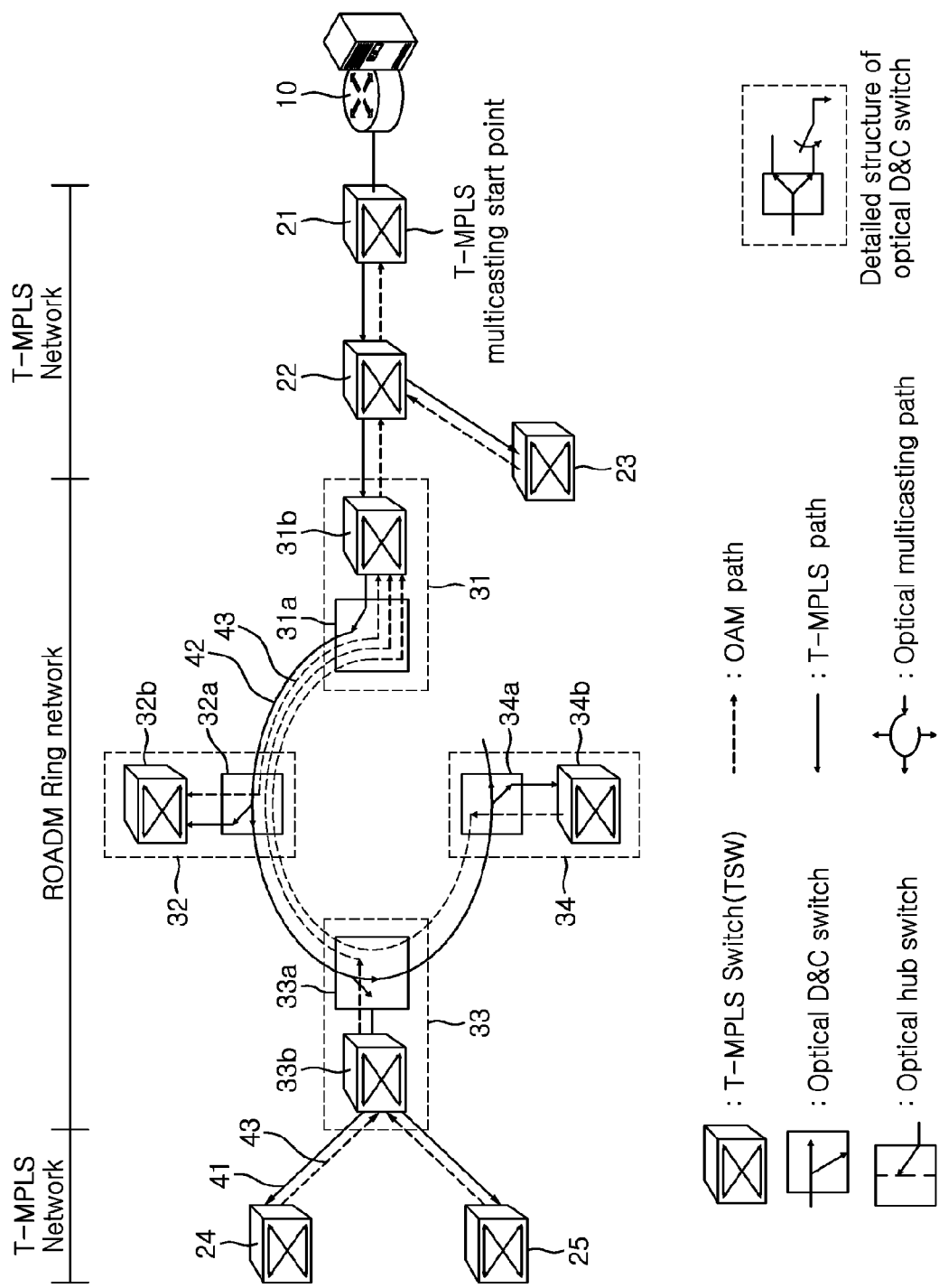
FIG. 1 illustrates the configuration of a network multicasting system according to an exemplary embodiment of the present invention.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art.

In the drawings, the shapes and dimensions may be exaggerated for clarity, and the same reference numerals will be used throughout to designate the same or like components.

Unless explicitly described to the contrary, the word "comprise" and variations such as "comprises" or "comprising," will be understood to imply the inclusion of stated elements but not the exclusion of any other elements.

Exemplary embodiments of the present invention will now be described in detail with reference to the accompanying drawings.

FIG. 1 illustrates the configuration of a network multicasting system according to an exemplary embodiment of the present invention.

With reference to FIG. 1, a network system according to an exemplary embodiment of the present invention employs a network including a transport multiprotocol label switching (T-MPLS) network in which multicasting is performed by the packet through T-MPLS, and a wavelength division multiplexing (WDM) network (e.g., a reconfigurable optical add-drop multiplex (ROADM) network) in which optical multicasting is performed.

A plurality of TSWs (T-MPLS switches) 21 to 25 are connected to the T-MPLS network, and a TOSW-HUB 31 and a plurality of TOSWs 32 to 34 are connected to the ROADM network.

Each of the TSWs 21 to 25 multicasts a T-MPLS signal transmitted from an upper node to a lower node. The TSW 21 located at a start point of the T-MPLS multicasting, namely, the TSW 21 connected to an IP-TV center 10, may additionally perform an operation of converting IP-TV data provided from an IP-TV center 10 into a T-MPLS signal format.

The TOSW-HUB 31 includes an optical hub-switch 31a for multicasting an optical multicasting signal to the ROADM network, and a TSW 31b for converting a T-MPLS signal transmitted from the T-MPLS network into an optical multicasting signal. The TOSW-HUB 31 converts the T-MPLS signal transmitted from the T-MPLS network into the optical multicasting signal and multicasts the converted optical multicasting signal to the ROADM network.

Each of the TOSWs 32 to 34 may include optical drop and continue (D&C) switches 32a to 34a for dropping the optical multicasting signal multicast via the ROADM network according to D&C function, and TSWs 32b to 34b for converting the optical multicasting signal which has been dropped by the optical D&C switches 32a to 34a into a T-MPLS signal and multicasting the converted T-MPLS signal to the T-MPLS network. And each of the TOSWs 32 to 34 drops the optical multicasting signal to the T-MPLS network.

The D&C function is a function of transmitting a signal to every service subscriber onetime and allowing for the signal to continue while being dropped to each intermediate subscriber. Thus, the multicasting signal is basically supplied to each of the TOSWs 32 to 34 according to the D&C function, and by turning on only the optical D&C switches 32a to 34a, the desired multicasting signal can be provided to the TSWs 32b to 34b.

The TSWs 21 to 25, the TOSW-HUB 31, and the TOSWs 32 to 34 each perform the establishment and release of a multicasting path and perform a multicasting operation by using their own label switch path (LSP) ID and a label switch router (LSR) ID.

The TSWs 21 to 25, the TOSW-HUB 31, and the TOSWs 32 to 34 each store their LSP ID and LSR ID in an upper node to establish a multicasting path with the upper node or erase their LSP ID and the LSR ID stored in the upper node to release the multicasting path with the upper node.

The TSWs 21 to 25, the TOSW-HUB 31, and the TOSWs 32 to 34 perform a multicasting operation by including an LSP ID of a lower node in a multicasting signal and transmitting the same. To this end, the first switch 21 located at a T-MPLS multicasting start point generates a T-MPLS signal including the LSP ID of the lower node 22 and multicasts it. The TSWs (e.g., 22 to 25), the TOSW-HUB (e.g., 31), and the TOSW (e.g., 33) on the multicasting path recognize the lower node which has requested the multicasting operation based on the LSP ID stored in themselves, replace the LSP ID included in the multicasting signal transmitted from the upper node with the LSP ID of the lower node, and multicast the same.

In addition, in order to prevent the occurrence of a collision between an operation, administration and maintenance (OAM) signal having the information (LSP ID and LSR ID) used for establishing and releasing the multicasting path and a multicasting signal, a signal path for transferring the OAM signal and a signal path for transferring the multicasting signal are separated.

The multicasting signals such as the T-MPLS signal and the optical multicasting signal are allowed to be transferred through a T-MPLS path 41 and an optical multicasting path 42, and the OAM signal is allowed to be transferred through a separate OAM path 43.

The OAM path 43 is established in a reverse direction to that of the T-MPLS path 41 and the optical multicasting path 42, and in particular, it is established within the ROADM network such that the TOSW-HUB 31 and each of the TOSWs 32 to 34 are mapped in a one-to-one manner.

In this manner, in the exemplary embodiment of the present invention, the communication networks each having different characteristics, namely, the T-MPLS network and the WDM network, are converged, upon which a multicasting path is established or released by using the LSP ID and the LSR ID and a multicasting operation is performed.

The establishment, addition, and release of a multicasting path and a multicasting operation in the network multicasting system according to an exemplary embodiment of the present invention will now be described in detail.

Figure 2:
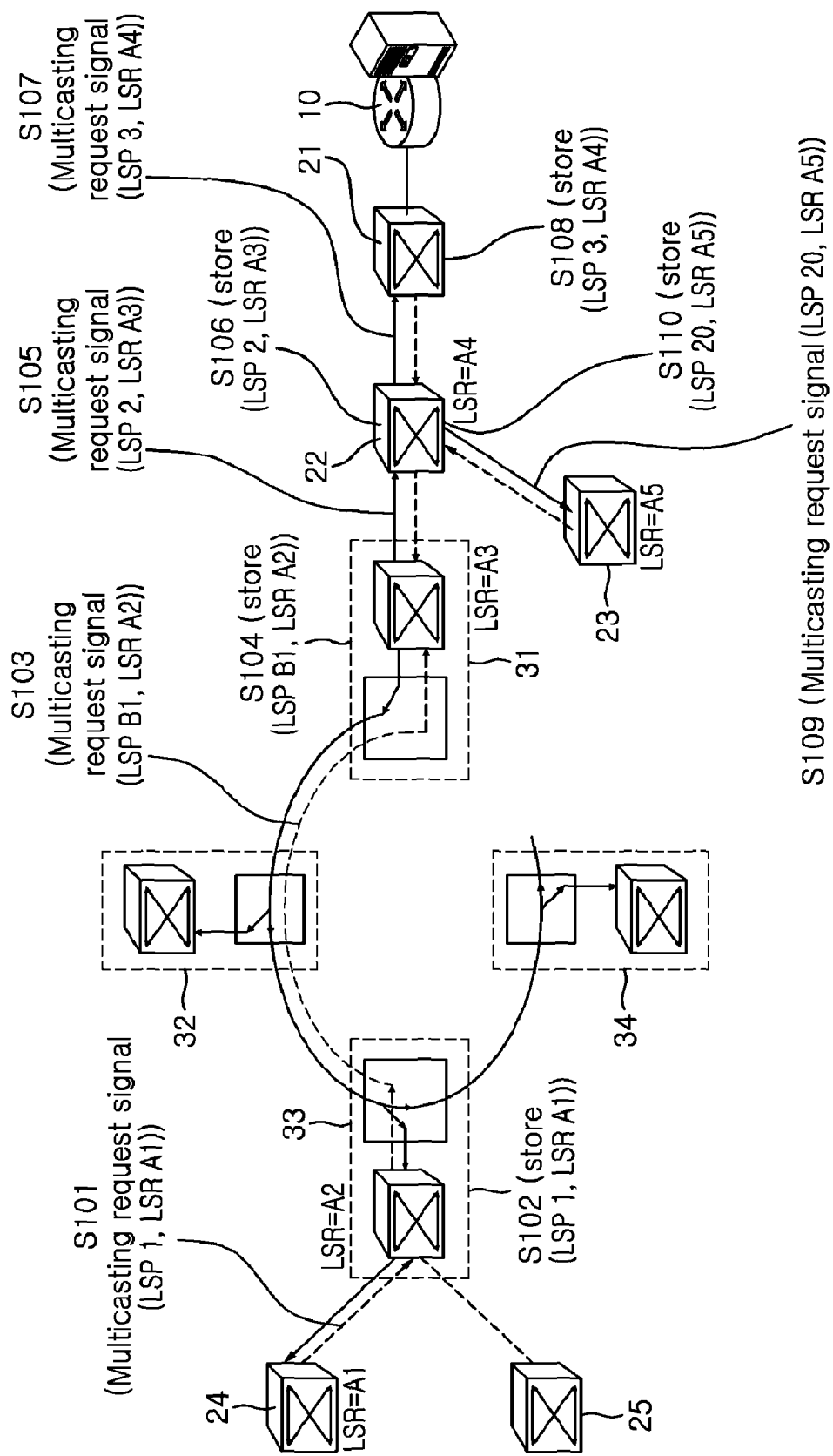
FIG. 2 illustrates the process of initially establishing a multicasting path according to an exemplary embodiment of the present invention.

FIG. 2 illustrates the process of initially establishing a multicasting path according to an exemplary embodiment of the present invention.

In FIG. 2, it is assumed that the TSW4 24 first requests the establishment of a multicasting path, for the sake of brevity.

First, the TSW4 24 generates a multicasting request signal including information about an LSP ID (LSP 1), i.e., the reservation number with respect to a path along which multicasting is to be performed via a T-MPLS path 41 and an LSR ID (LSRA1), i.e., its node address, and transfers the generated multicasting request signal to the upper TOSW3 33 (S101).

The TOSW3 33 adds a multicasting path with the TSW4 24 by storing the reservation number LSP1 and the node address A1 included in the multicasting request signal, and turns on the optical switch 33a so as to be ready for receiving an optical multicasting signal transmitted via the ROADM network.

The TOSW3 33 generates a multicasting request signal including an LSP ID (LSP B1 commonly used by the TOSWs connected to the ROADM network) and its LSR ID (LSR A2), and transmits the generated multicasting request signal to the TOSW-HUB 31 (S103).

In an exemplary embodiment of the present invention, as the LSP ID (LSP B1) included in the multicasting request signal generated by the TOSWs connected to the same ROADM network, a value previously designated by an operator may be used. For example, the LSP IDs of the TOSWs 32 to 34 are all assigned as LSP B1.

Namely, the TOSWs 32 to 34 connected to the same ROADM network are assigned each different LSR ID but a common value of LSP ID.

This aims to allow the TOSWs 32 to 34 to discriminate whether or not a multicasting request signal is a signal (i.e., an optical multicasting request signal) which has been generated by one TOSW connected to the ROADM network to which the other TOSWs are connected or whether or not a multicasting request signal is a signal (i.e., a T-MPLS multicasting request signal) which has been generated from a different communication network (e.g., T-MPLS network).

With reference to FIG. 2, the TOSW-HUB 31 and the TSW2 22 also store the LSP ID and the LSR ID included in the multicasting request signal transmitted from the lower node in the same manner as described above to add a multicasting path with the TOSW 33 and the TOSW-HUB 31 (S104, S106), generate a multicasting request signal including their own LSP ID and LSR ID, and transfer them to the upper node (S105, S107).

Then, the TSW1 21 located at the T-MPLS multicasting start point finally receives the multicasting request signal of the TSW2 22, and adds the multicasting path with the TSW2 22 by storing the LSP ID LSP3 and the LSR ID LSR A4 included in the multicasting request signal (S108).

In this manner, in the exemplary embodiment of the present invention, the lower node establishes the multicasting path between the lower nodes and the upper nodes by storing its LSP ID and LSR ID in the upper node, and finally, the multicasting path is established from the TSW4 24 which has first requested the multicasting operation to the TSW1 21 located at the T-MPLS multicasting start point.

If the establishment of a multicasting path is additionally requested by a particular TSW in a state that the multicasting path has been completely established, an upper node of the particular TSW directly adds a multicasting path to the particular TSW. Namely, the upper node of the particular TSW adds only the multicasting path between the upper node of the particular TSW and the particular TSW, without transferring the multicasting request signal of the particular TSW to the T-MPLS multicasting start point.

For example, when the TSW3 23 generates a multicasting request signal to additionally request the establishment of a multicasting path (S109), the TSW2 22, an upper node of the TSW3 23, stores an LSP ID and an LSR ID of the TSW3 23 to add only the multicasting path to the TSW3 23 (S110).

When the establishment of the multicasting path is successfully completed, the node positioned on the multicasting path stores the information about the lower node which has requested multicasting from the node, namely, the same label value as the LSP ID. Accordingly, each node positioned on the multicasting path replaces the LSP ID included in the multicasting signal transmitted from its upper node with an LSP ID of its lower node and transfers the same, thereby performing a multicasting operation.

Figure 3:
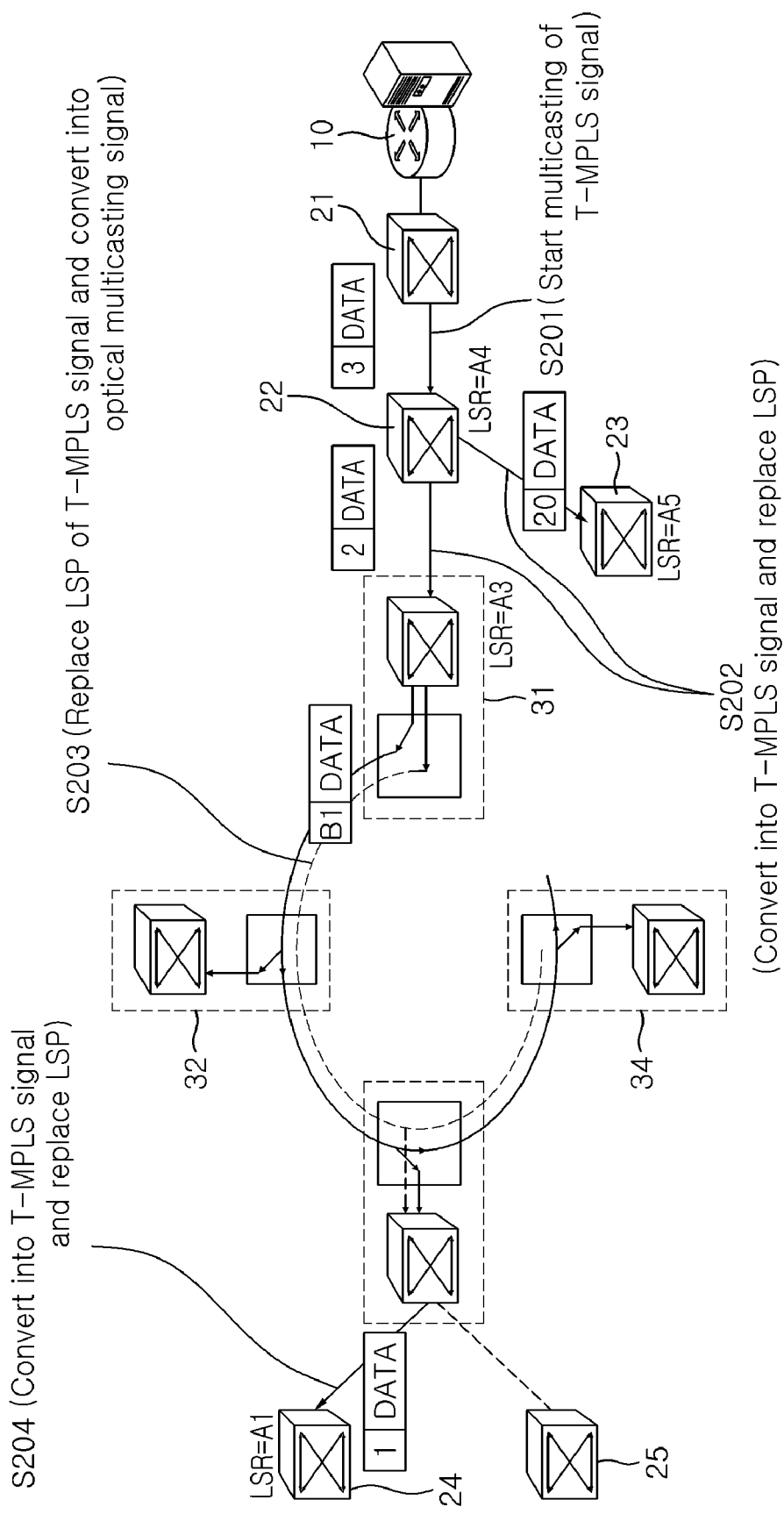
FIG. 3 illustrates a multicasting process according to an exemplary embodiment of the present invention.

FIG. 3 illustrates a multicasting process according to an exemplary embodiment of the present invention.

The process of transferring a multicasting signal from the TSW1 21 positioned at the T-MPLS multicasting start point to the TSW4 24, the final destination when a multicasting path is established as shown in FIG. 3 will now be described for the sake of brevity.

When IP-TV data is transmitted from the IP-TV center 10, the TSW1 21 positioned at the T-MPLS multicasting start point converts the IP-TV data into a T-MPLS signal, adds an LSP ID of a lower node which has requested a multicasting operation to the T-MPLS signal, and multicasts it (S201).

As the TSW1 starts the multicasting of the T-MPLS signal, the TSW222 replaces the LSP ID included in the T-MPLS signal transmitted from the TSW1 21 with an LSP ID of the TOSW-HUB 31 and the TSW3 23, and multicasts it (S202).

The TOSW-HUB 31 replaces the LSP ID included in the T-MPLS signal transmitted from the TSW2 22 with an LSP ID of the TOSW3 33 again, converts it into an optical multicasting signal, and multicasts it to the ROADM network (S203).

Then, the TOSW3 33 drops the optical multicasting signal transmitted via the ROADM network by using the optical D&C switch 33a, converts it into a T-MPLS signal by using the TSW 33b, replaces the LSP ID included in the T-MPLS signal with an LSP ID of the TSW4 24, and multicasts it (S204).

Then, the TSW4 24 receives the subscriber-desired T-MPLS signal and provides a subscriber-desired service.

Figure 4:
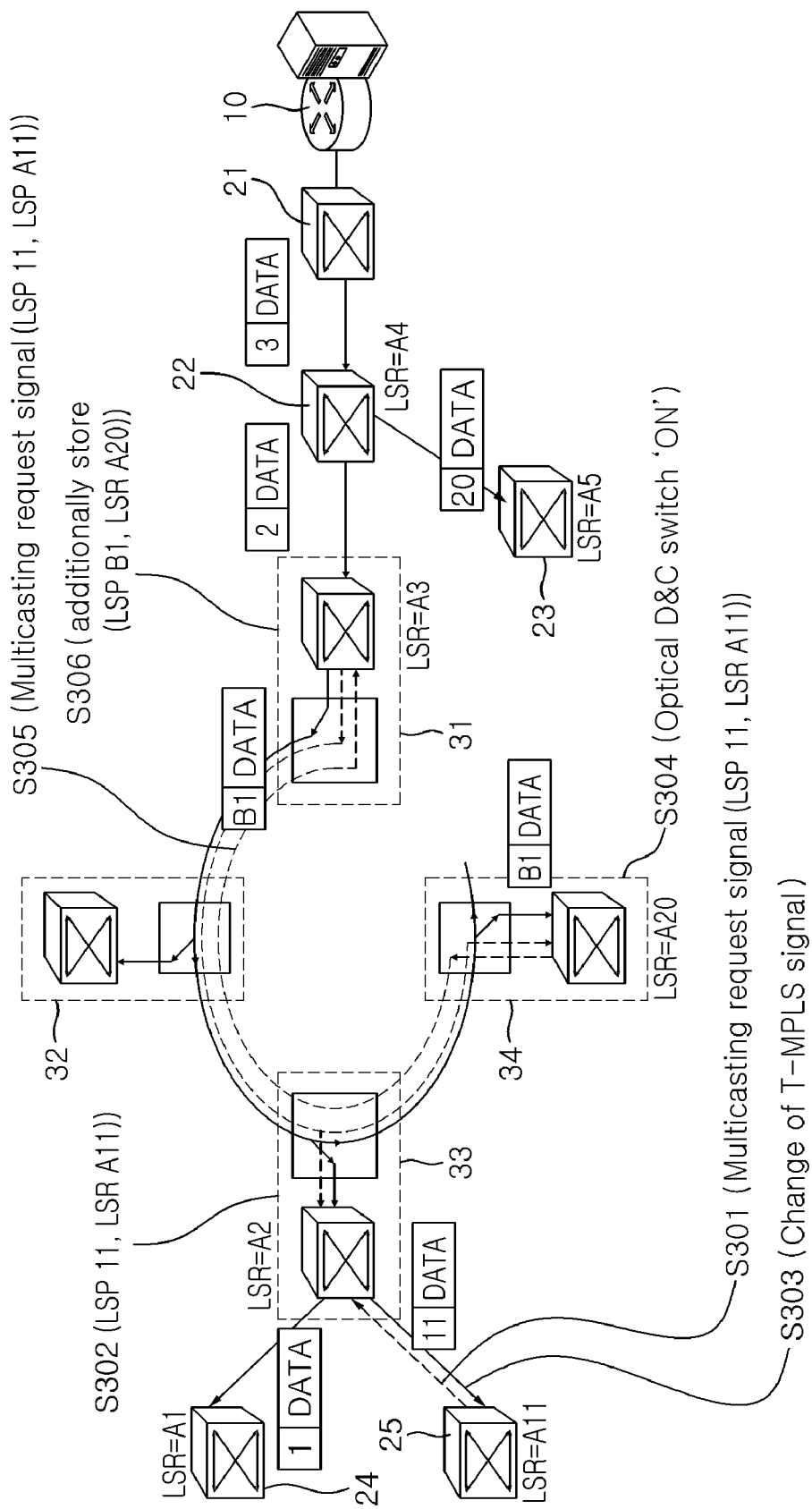
FIG. 4 illustrates the process of adding a multicasting path according to an exemplary embodiment of the present invention.

FIG. 4 illustrates the process of adding a multicasting path according to an exemplary embodiment of the present invention.

When a subscriber of the TSW5 25 additionally requests a multicasting operation while multicasting is being performed as shown in FIG. 4, the TSW5 25 generates a multicasting request signal including its LSP ID (LSP11) and LSR ID (LSR All), and transfers the generated multicasting request signal to the TOSW3 33, an upper node of the TSW5 25 (S301).

Then, the TOSW3 33 stores the LSP ID (LSP 11) and the LSR ID (LSR A11) of the TSW5 included in the multicasting request signal (S302), in addition to the LSP ID (LSP 1) and the LSR ID (LSR Al) of the TSW4 24, duplicates the signal multicast to the TSW4 24, and provides it also to the TSW5 25 (S303).

Namely, the TOSW3 33, for which the multicasting path has been already established, additionally establishes the dedicated multicasting path between the TOSW3 33 and the TSW5 25, simply duplicates the signal multicast to the TSW4 24 and provides it to the TSW5 25.

Meanwhile, when the TOSW4 34, for which a multicasting path has not been established, requests a multicasting operation, the TOSW4 34 turns on its optical D&C switch 34a to drop a multicasting signal (S304) and transfers the dropped multicast signal to its lower node.

The TOSW4 34 then provides a multicasting request signal including its LSP ID (LSP B1) and LSR ID (LSR A20) to the TOSW-HUB 31, namely, its upper node (S305), to allow the TOSW-HUB 31 to additionally establish a multicasting path with the TOSW4 34 (S306).

In this manner, in the present exemplary embodiment, when an LSP ID and an LSR ID are additionally stored by a lower node in a state wherein a multicasting path to a certain device has been established, the corresponding device additionally only establishes the multicasting path to the lower node.

In this respect, it is also noted that if an LSP ID and an LSR ID are first (i.e., initially) stored by the lower node in a state that a multicasting path to the certain device has not been established, the corresponding device additionally establishes a multicasting path with an upper node as well as a multicasting path with the lower node.

In this manner, in the exemplary embodiment of the present invention, as the lower node stores its LSP ID and LSR ID in the upper node, a multicasting path with the upper node is established.

Also, as the lower node erases its LSP ID and LSR ID from the upper node, the multicasting path with the upper node is released.

Figure 5:
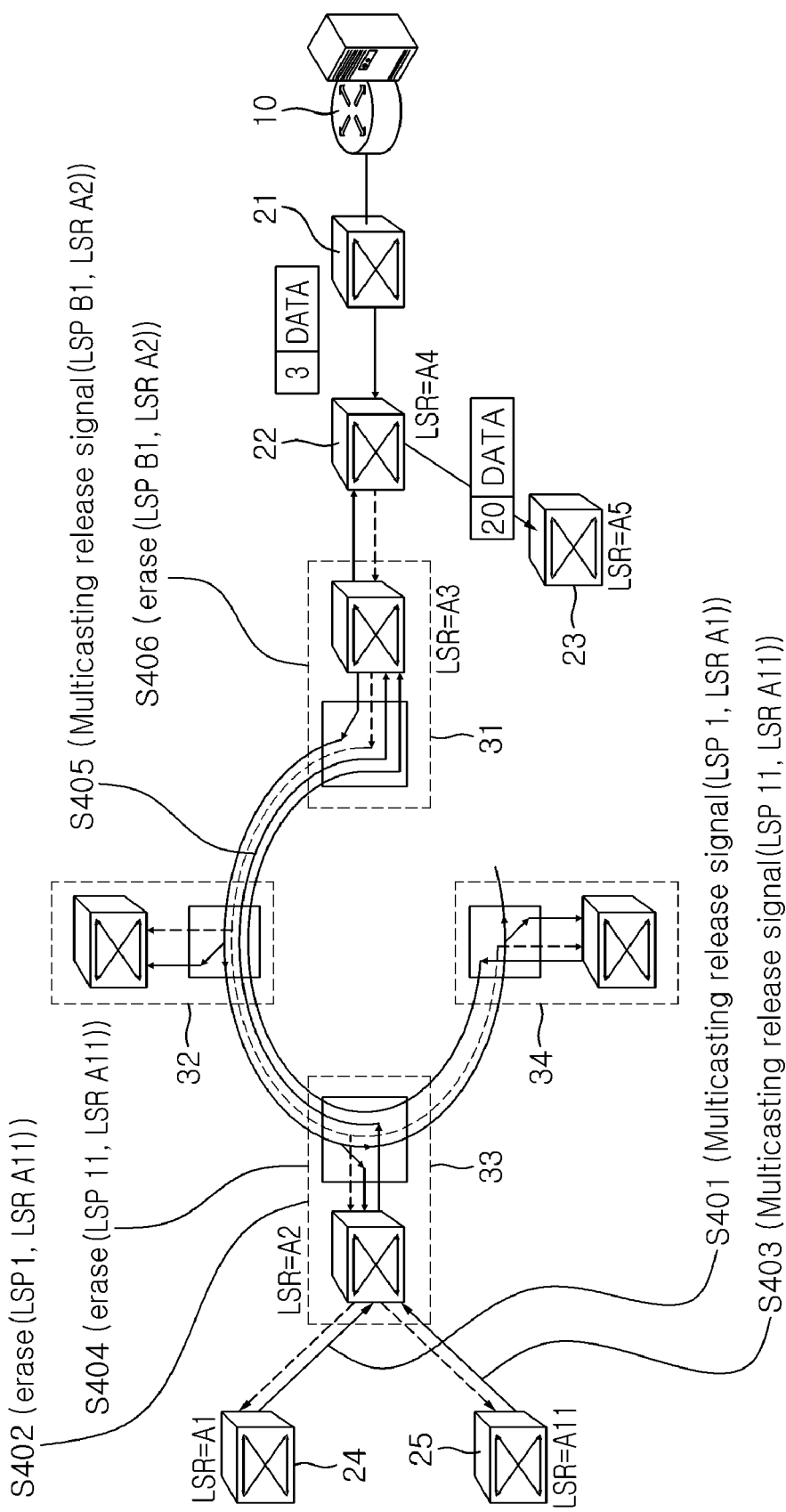
FIG. 5 illustrates the process of releasing a multicasting path according to an exemplary embodiment of the present invention.

FIG. 5 illustrates the process of releasing a multicasting path according to an exemplary embodiment of the present invention.

If the TSW4 24 wants to release the multicasting path with the TOSW3 33, the TSW4 24 generates a multicasting release signal including its LSP ID and LSR ID and transfers it to the TOSW3 33 (S401).

In response to the multicasting release from the TSW4 24, the TOSW3 33 erases the LSP ID (LSP 1) and LSR ID (LSR A1) of the TSW4 24, releases the multicasting path to the TSW4 24, and stops multicasting with respect to the TSW4 24 (S402).

Following the TSW4 24, if the TSW5 also transmits a multicasting release signal (S403), the TOSW3 33 releases the multicasting path with the TSW5 25 and stops multicasting to the TSW5 25 in the same manner.

If the multicasting path between the TOSW3 33 and the lower node is entirely released, so the information of the lower node is erased from the TOSW3 33, the TOSW3 33 generates a multicasting release signal including its LSP ID (LSP B1) and LSR ID (LSR A2) and transmits it to the TOSW-HUB 31, its upper node (S405).

Then, the TOSW-HUB 31 erases the LSP ID (LSP B1) and LSR ID (LSRA2) of the TOSW3 33 to release the multicasting path to the TOSW3 33 (S406).

In this manner, the TSWS, the TOSWs and the TOSW-HUB release the multicasting path to the lower node.

Namely, the lower node releases the multicasting path to the upper node by erasing its LSP ID and LSR ID stored in the upper node, and when the LSP ID and the LSR ID of the lower node stored in the upper node are all erased by the lower node, the upper node releases the multicasting path with its upper node.

Figure 6:
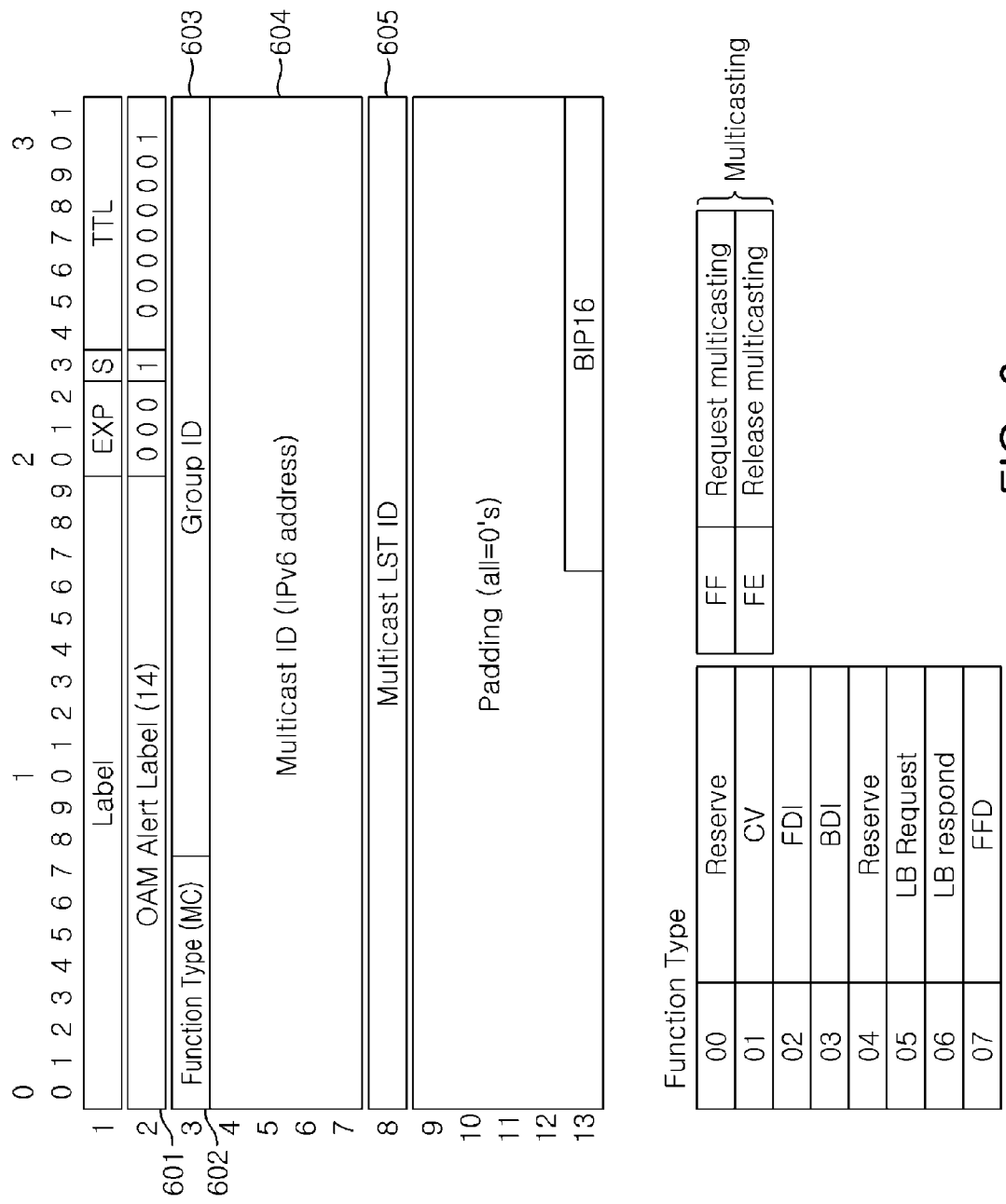
FIG. 6 illustrates the structure of an optical, administration & maintenance (OAM) signal such as a multicasting request signal, a multicasting release signal, or the like, according to an exemplary embodiment of the present invention.

FIG. 6 illustrates the structure of the OAM signal such as the multicasting request signal, the multicasting release signal, or the like, according to an exemplary embodiment of the present invention. In the present exemplary embodiment, the basic structure of the T-MPLS OAM packet recommended by the ITU-T recommendation Y.1711 is utilized.

An '0x14' value is designated in an OAM alert label region 601 in order to indicate that a current packet is an OAM signal like a multicasting request signal or a multicasting release signal.

An '0xFF' or an '0xFE' value is designated in a function type field 602 to indicate whether or not a current OAM signal is a multicasting request signal or a multicasting release signal. The function type field 602 is used only for monitoring the LSP ID in the related art, but not for the T-MPLS OAM as in the present invention.

A group ID requesting multicasting is designated in a Group ID region 603 to discriminate a group requesting multicasting.

An LSP ID of a device requesting the establishment or release of a multicasting path is designated in a multicast LSR ID region 604.

An LSR ID of a device requesting the establishment or release of a multicasting path is designated in a multicast LSP ID region 605 in order to discriminate a device requesting the establishment or release of a multicasting path.

The T-MPLS OAM packet frame format may use the same frame format of the existing MPLS.

Figure 7:
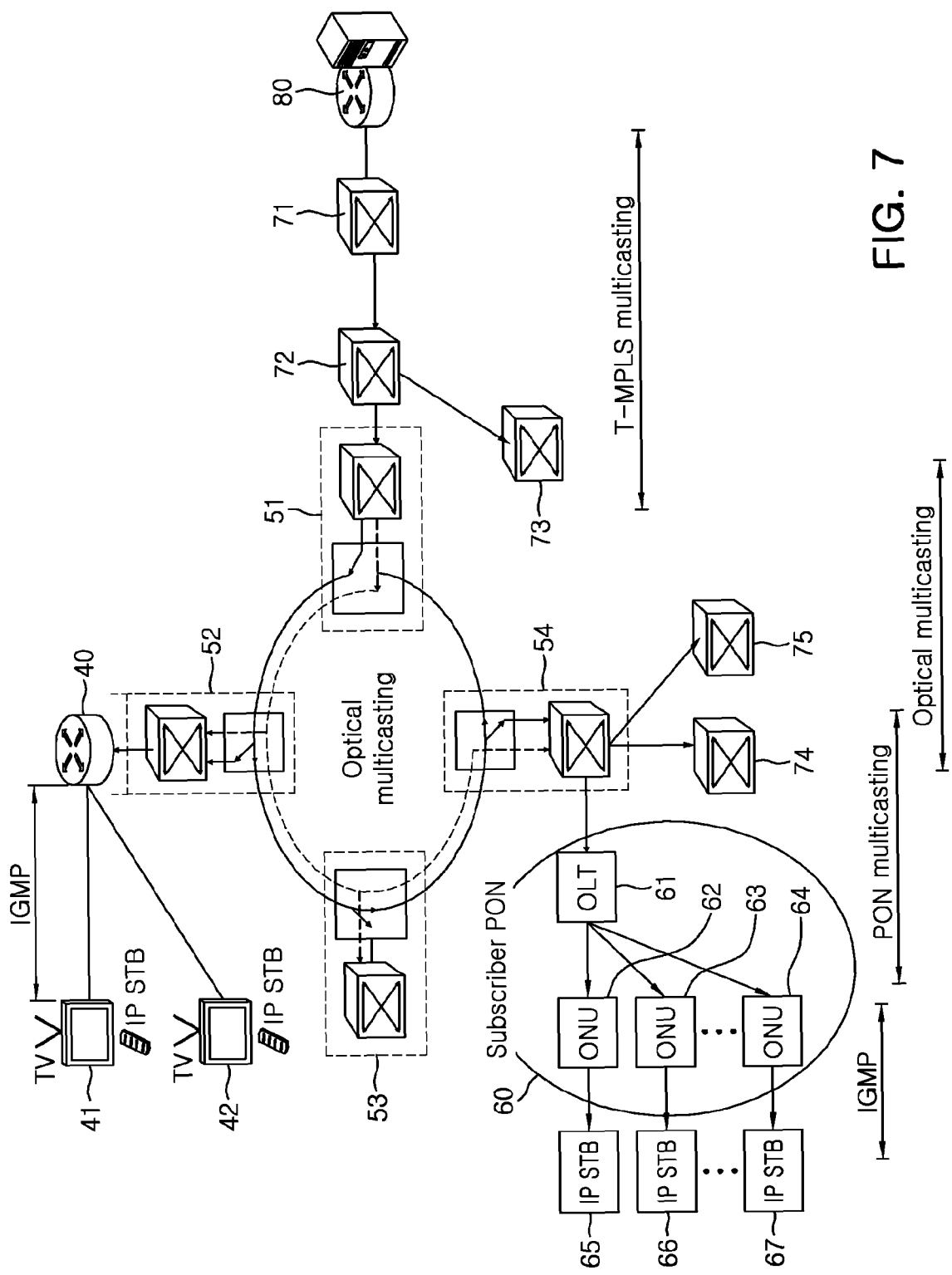
FIG. 7 illustrates the configuration of a LIVE IP-TV network using a cross-layer multicasting method according to an exemplary embodiment of the present invention.

FIG. 7 illustrates the configuration of a LIVE IP-TV network using a cross-layer multicasting method according to an exemplary embodiment of the present invention.

An IP multicasting router 40 may be connected to the TOSW2 52, and an optical line termination (OLT) 61 of a subscriber passive optical network (PON) may be connected to the TOSW4 54.

Then, the IP multicasting router 40 simply needs to operate an Internet group management protocol (IGMP) between the IP multicasting router 40 and Internet protocol (IP) set top boxes (STBs) 41 and 42 to select and transmit a subscriber-desired channel and transmit.

When the OLT 61 is connected, every TV channel's data may be transmitted to the OLT 61, and the OLT 61 can transmit every TV channel to optical network units (ONUs) 62 to 64 by using an optical splitting function, the characteristics of the PON. Then, the STBs 65 to 67 can selectively receive TV channels from the ONUs 62 to 64, reducing the time taken for selecting channels.

Thus, because the both cases do not need a protocol such as a PIM-SM, i.e., an IP multicast protocol, in the network, the cross-layer multicasting method according to the exemplary embodiment of the present invention can be used for the purpose of transmitting a large capacity of IP-TV data without using an IP multicasting router.

As set forth above, according to exemplary embodiments of the invention, because IP-TV data are multicast by using the T-MPLS multicasting technique supporting a large capacity of data transmission and the optical multicasting technique, LIVE IP-TV broadcast services of hundreds of channels requiring large capacity of multicasting can be supported.

In addition, because the multicasting path can be established, added or released by using the OAM technique of the T-MPLS multicasting technique, network efficiency can be increased, the network controlling can be simplified, and degradation of a signal quality otherwise caused by a packet collision due to an IP router can be prevented.

While the present invention has been shown and described in connection with the exemplary embodiments, it will be apparent to those skilled in the art that modifications and variations can be made without departing from the spirit and scope of the invention as defined by the appended claims.

What is claimed is:

1. A multicasting method in a network including a transport multiprotocol label switching (T-MPLS) network in which first switches are connected, and a wavelength division multiplexing (WDM) network in which second switches and a switch hub are connected, the method comprising:

establishing, by using at least one of the first switches, the second switches, and the switch hub, a multicasting path by registering its label switch path (LSP) ID and a label switch router (LSR) ID to an upper node; and replacing, by the first switch, the second switch, or the switch hub on the multicasting path, an LSP ID included in a multicasting signal transferred from the upper node into an LSP ID of a lower node, and multicasting the multicasting signal to the lower node, wherein the first switch multicasts a T-MPLS signal, the switch hub converts the T-MPLS signal into an optical multicasting signal and multicasts the converted optical multicasting signal, and the second switch converts the optical multicasting signal into units of the T-MPLS signals and multicast the same, wherein the establishing of the multicastinq path comprises:

requesting, by at least one of the first switches, the second switches, and the switch hub, the establishment of a multicasting path with an upper node by storing its LSP ID and LSR ID in the upper node; storing, by the lower node, the LSP ID and the LSR ID; and establishing, by the first switch, the second switch, or the switch hub, a multicastinq path corresponding to the stored LSP ID and the LSR ID and, at the same time, requesting the establishment of a multicasting path with the upper node.

2. The multicasting method of claim 1, the establishing of the multicasting path further comprises:

when the LSP ID and the LSR ID are additionally stored by the lower node, additionally establishing, by the first switch, the second switch, or the switch hub, only a multicasting path corresponding to the additionally stored LSP ID and LSR ID.

3. The multicasting method of claim 1, further comprising:

releasing, by at least one of the first switches, the second switches, and the switch hub, the multicasting path by using its LSP ID and LSR ID.

4. The multicasting method of claim 3, wherein the releasing of the multicasting path comprises:

requesting, by at least one of the first switches, the second switches, and the switch hub, release of the multicasting path with the upper node by erasing its LSP ID and LSR ID stored in the upper node;

when the LSP ID and the LSR ID are erased by the lower node, releasing, by the first switch, the second switch, or the switch hub, the multicasting path corresponding to the erased LSP ID and the LSR ID; and when LSP IDs and the LSR IDs are all released by the lower node, releasing, by the first switch, the second switch, or the switch hub, the multicasting path corresponding to all of the erased LSP IDs and LSR IDs, and at the same time, requesting the release of the multicasting path with the upper node.

5. The multicasting method of claim 1, wherein the performing of multicasting comprises:

generating, by a first switch positioned at a T-MPLS multicasting start point, a T-MPLS signal including an LSP ID of a lower node, and multicasting the generated T-MPLS signal;

replacing, by the first switch which has received the T-MPLS signal, the LSP ID included in the T-MPLS signal with an LSP ID of the lower node, and multicasting the same;

replacing, by a switch hub which has received the T-MPLS signal, the LSP ID included in the T-MPLS signal with the LSP ID of the lower node, converting the same into an optical multicasting signal, and multicasting the converted optical multicasting signal to the WDM network; and converting, by the second switch which has received the optical multicasting signal, the optical multicasting signal into a T-MPLS signal, replacing an LSP ID included in the converted T-MPLS signal with the LSP ID of the lower node, and multicasting the same.

6. The multicasting method of claim 1, wherein the first switches and the hub switch each are assigned an LSP ID and an LSR ID each having a unique value, and the second switches each are assigned an LSR ID having a unique value, and in this case, each of the second switches is assigned an LSP ID having a common value within the same WDM network.

7. The multicasting method of claim 1, wherein the first switches, the second switches, and the switch hub each provide an LSR ID and an LSP ID for requesting the establishment or release of a multicasting path to an upper node by using a T-MPLS operations, administration and maintenance (OAM) packet.

8. The multicasting method of claim 7, wherein the T-MPLS OAM packet comprises:

an OAM alert label region in which information indicating that a signal is an OAM signal is stored;

a function type region in which information indicating whether or not a type of the OAM signal is a multicasting request signal or a multicasting release signal;

a group ID region in which a multicast group ID is stored;

an LSR ID region in which an LSR ID is stored; and an LSP ID region in which an LSP ID is stored.

9. A method of operating a multicasting switch connected to a transport multiprotocol label switching (T-MPLS) network in a network including the T-MPLS network and a wavelength division multiplexing (WDM) network, the method comprising:

requesting the establishment or release of a multicasting path by transmitting a multicasting request signal or a multicast release signal including a label switch path (LSP) ID and a label switch router (LSR) ID to an upper node;

establishing a multicasting path to a lower node by storing the LSP ID and the LSR ID included in the multicasting request signal transmitted from the lower node, or releasing a multicasting path to the lower node by erasing the LSP ID and the LSR ID included in the multicast release signal transmitted from the lower node; and including the LSP ID of the lower node to a T-MPLS signal and multicasting the T-MPLS signal, wherein the requesting of the establishment or release of a multicastinq path comprises:

when the LSP ID and the LSR ID are first stored by a lower node, establishing a multicasting path corresponding to the first stored LSP ID and the LSR ID and, at the same time, requesting an upper node to establish a multicastinq path.

10. The method of claim 9, wherein the requesting of the establishment or release of a multicasting path further comprises:

when an LSP ID and an LSR ID are additionally stored by the lower node, additionally establishing only a multicasting path corresponding to the additionally stored LSP ID and LSR ID;

when an LSP ID and an LSR ID are erased by the lower node, releasing a multicasting path corresponding to the erased LSP ID and the LSR ID; and when all the LSP IDs and LSR IDs are erased by the lower node, releasing multicasting paths corresponding to all of the erased LSP IDs and LSR IDs and, at the same time, requesting the release of the multicasting path with the upper node.

11. The method of claim 9, wherein the multicasting of the T-MPLS signal comprises:

when IP-TV data is received from an upper node, converting the IP-TV data into a T-MPLS signal, including an LSP ID of a lower node in the converted T-MPLS signal, and multicasting the same, and when a T-MPLS signal is received from an upper node, replacing an LSP ID included in the received T-MPLS signal with the LSP ID of the lower node and multicasting the same.

12. A network switch connected to a wavelength division multiplexing (WDM) network of a network including a transport multiprotocol label switching (T-MPLS) network and the WDM network, the network switch comprising:

an optical drop and continue (D&C) switch configured to drop an optical multicasting signal transmitted via the WDM network; and a multicasting switch configured to convert the optical multicasting signal, which has been dropped by the optical D&C switch, into a T-MPLS signal and multicast the converted T-MPLS signal, wherein the multicasting switch requests the establishment or release of a multicasting path by transmitting a multicasting request signal or a multicast release signal including a label switch path (LSP) ID and a label switch router (LSR) ID to an upper node, and establishes a multicasting path to a lower node by storing the LSP ID and the LSR ID included in the multicasting request signal transmitted from the lower node or releases a multicasting path to the lower node by erasing the LSP ID and the LSR ID included in the multicast release signal transmitted from the lower node, wherein when an LSP ID and an LSR ID are first stored by a lower node, the multicastinq switch establishes a multicastinq path corresponding to the first stored LSP ID and the LSR ID and, at the same time, requests the establishment of a multicastinq path from an upper node.

13. The network switch of claim 12, wherein when an LSP ID and an LSR ID are additionally stored by the lower node, the multicasting switch additionally establishes a multicasting path corresponding to the additionally stored LSP ID and the LSR ID, when an LSP ID and an LSR ID are erased by the lower node, the multicasting switch releases a multicasting path corresponding to the erased LSP ID and the LSR ID, and when all of LSP IDs and LSR IDs are erased by the lower node, the multicasting switch releases the multicasting paths corresponding to all of the erased LSP IDs and LSR IDs and, at the same time, requests the release of the multicasting path with the upper node.

14. The network switch of claim 12, wherein the multicasting switch replaces the LSP ID included in the T-MPLS signal with the LSP ID of the lower node, and multicasts the same.

15. A switch hub connected to a wavelength division multiplexing (WDM) network of a network including a transport multiprotocol label switching (T-MPLS) network and the WDM network, the switch hub comprising:

an optical hub switch configured to multicast an optical multicasting signal to the WDM network; and a multicasting switch configured to convert a T-MPLS signal transmitted from the T-MPLS network into the optical multicasting signal and transfer the converted optical multicasting signal to the optical hub switch, wherein the multicasting switch requests the establishment of a multicasting path by transmitting a multicasting request signal including a label switch path (LSP) ID and a label switch router (LSR) ID to an upper node, or requests the release of a multicasting path by transmitting a multicasting release signal including the LSP ID and the LSR ID to the upper node, establishes a multicasting path to a lower node by storing the LSP ID and the LSR ID included in the multicasting request signal transmitted from the lower node, or releases a multicasting path to the lower node by erasing the LSP ID and the LSR ID included in the multicast release signal transmitted from the lower node, wherein multicastinq switch establishes a multicastinq path corresponding to the first stored LSP ID and the LSR ID and, at the same time, requests the establishment of a multicastinq path from an upper node.

16. The switch hub of claim 15, wherein when an LSP ID and an LSR ID are additionally stored by the lower node, the multicasting switch additionally establishes a multicasting path corresponding to the additionally stored LSP ID and the LSR ID, when an LSP ID and an LSR ID are erased by the lower node, the multicasting switch releases a multicasting path corresponding to the erased LSP ID and the LSR ID, and when all of LSP IDs and LSR IDs are erased by the lower node, the multicasting switch releases the multicasting paths corresponding to all of the erased LSP IDs and LSR IDs and, at the same time, requests the release of the multicasting path with the upper node.

17. The switch hub of claim 15, wherein the multicasting switch replaces the LSP ID included in the T-MPLS signal with the LSP ID of the lower node, and multicasts the same.

* * * * *